US010390649B2

(12) United States Patent
Lin

(10) Patent No.: US 10,390,649 B2
(45) Date of Patent: Aug. 27, 2019

(54) DIFFUSER FOR BEVERAGES

(71) Applicant: INTERCON TRADER LTD., Taipei (TW)

(72) Inventor: Yuan-Huei Lin, Taipei (TW)

(73) Assignee: JIN HONG DA ENTERPRISE CO., LTD., Changhua County (TW)

( * ) Notice: Subject to any disclaimer, the term of this patent is extended or adjusted under 35 U.S.C. 154(b) by 203 days.

(21) Appl. No.: 15/442,666

(22) Filed: Feb. 25, 2017

(65) Prior Publication Data

US 2018/0242775 A1 Aug. 30, 2018

(51) Int. Cl.
*A47J 31/06* (2006.01)

(52) U.S. Cl.
CPC ....... *A47J 31/0636* (2013.01); *A47J 31/0615* (2013.01)

(58) Field of Classification Search
CPC .......................... A47J 31/0636; A47J 31/0615
USPC ........................................... 99/322, 323, 318
See application file for complete search history.

(56) References Cited

U.S. PATENT DOCUMENTS

| | | | | |
|---|---|---|---|---|
| 545,936 A * | 9/1895 | Bentall | 99/322 | |
| 2,093,980 A * | 9/1937 | Linger | A47G 19/14 | 99/285 |
| 3,657,994 A * | 4/1972 | Post | A47J 31/18 | 426/82 |
| 9,010,238 B2 * | 4/2015 | Bodum | A47J 31/20 | 222/473 |
| 2012/0012008 A1 * | 1/2012 | Kwok | A47J 31/0615 | 99/297 |

FOREIGN PATENT DOCUMENTS

| | | | |
|---|---|---|---|
| GB | 209893 * | 1/1924 | A47J 31/0636 |

* cited by examiner

*Primary Examiner* — Reginald Alexander

(57) ABSTRACT

A diffuser for beverages comprising: a container, a cover, an outer diffuser body, an inner diffuser body and a diffuser cover. The container has a containment space with a main opening. The cover has a stepped assembly opening. The outer diffuser body has a cup-shaped body with a side opening. The inner diffuser body has a cup-shaped body corresponding to the outer diffuser body, and the inner diffuser body has a filtering portion with a plurality of filtering apertures and a plurality of positioning protrusions. by rotating the inner diffuser body, the positioning protrusion moves between the open end and the closed end of the rotation slot to control the filtering portion of the inner diffuser body to align with the side opening of the outer diffuser body or offset away from the side opening to connect or separate the container and the inner diffuser body.

8 Claims, 6 Drawing Sheets

DIFFUSER FOR BEVERAGES

BACKGROUND of INVENTION

1. Field of Invention

The present invention relates to a diffuser, and more particularly to a diffuser for beverages.

2. Description of Related Art

The current known tea diffusing device has a container, the container can be a teapot or a cup, the container and then have a pick up, and has a large filter hole filter, when used, is The water will be injected into the container, and then the built-in tea filter from the container on the main opening into its internal and put in the container on the main opening, so that the container in the water can pass through the filter To the filter to do the import, so that the tea can be fully immersed in the filter, after the release, and then provide drinking.

However, the above-mentioned known structure in the practical application of the following problems still exist: the tea is soaked in the container, so that the container of tea because of tea soak for too long, and gradually become bitter, difficult to import, in order to avoid excessive tea soaked, can be removed through the filter, together with the tea from the container, but the removal of the action is more inconvenient and trouble, when the filter is removed without fully dry, may cause the tea stain on the desktop.

Therefore, it is desirable to provide diffuser for beverages to mitigate and/or obviate the aforementioned problems.

SUMMARY of INVENTION

An objective of present invention is to provide a shear with wheeled blades which is capable of performing rotatory cutting.

In order to achieve the above mentioned objective, A diffuser for beverages has: a container, a cover, an outer diffuser body, an inner diffuser body and a diffuser cover.

The container has a bottom portion and a circular sidewall to form a containment space with a main opening. The cover has a stepped assembly opening, the assembly opening provided with a first lip, a first stopping rim, a second lip and a second stopping rim, the second lip having a plurality of rotation slots respectively with a closed end and an open end passing through the first stopping rim, the cover removably attached onto the container and covering the main opening.

The outer diffuser body has a cup-shaped body with at lease one side opening, the outer diffuser body disposed in the container, the second stopping rim of the cover used for engaging with the outer diffuser body The inner diffuser body has a cup-shaped body corresponding to the outer diffuser body, the inner diffuser body having a filtering portion with a plurality of filtering apertures on its sidewall and a plurality of positioning protrusions evenly disposed on its outer surface, and when the inner diffuser body is placed in the outer diffuser body through the assembly opening, the positioning protrusion is aligned with the open end of the rotation slot, and by rotating the inner diffuser body, the positioning protrusion moves between the open end and the closed end of the rotation slot to control the filtering portion of the inner diffuser body to align with the side opening of the outer diffuser body or offset away from the side opening to connect or separate the container and the inner diffuser body. The diffuser cover is removably attached onto the cover and configured for covering the assembly opening of the cover.

Other objects, advantages, and novel features of invention will become more apparent from the following detailed description when taken in conjunction with the accompanying drawings.

DETAILED DESCRIPTION OF PREFERRED EMBODIMENT

Figure 1:
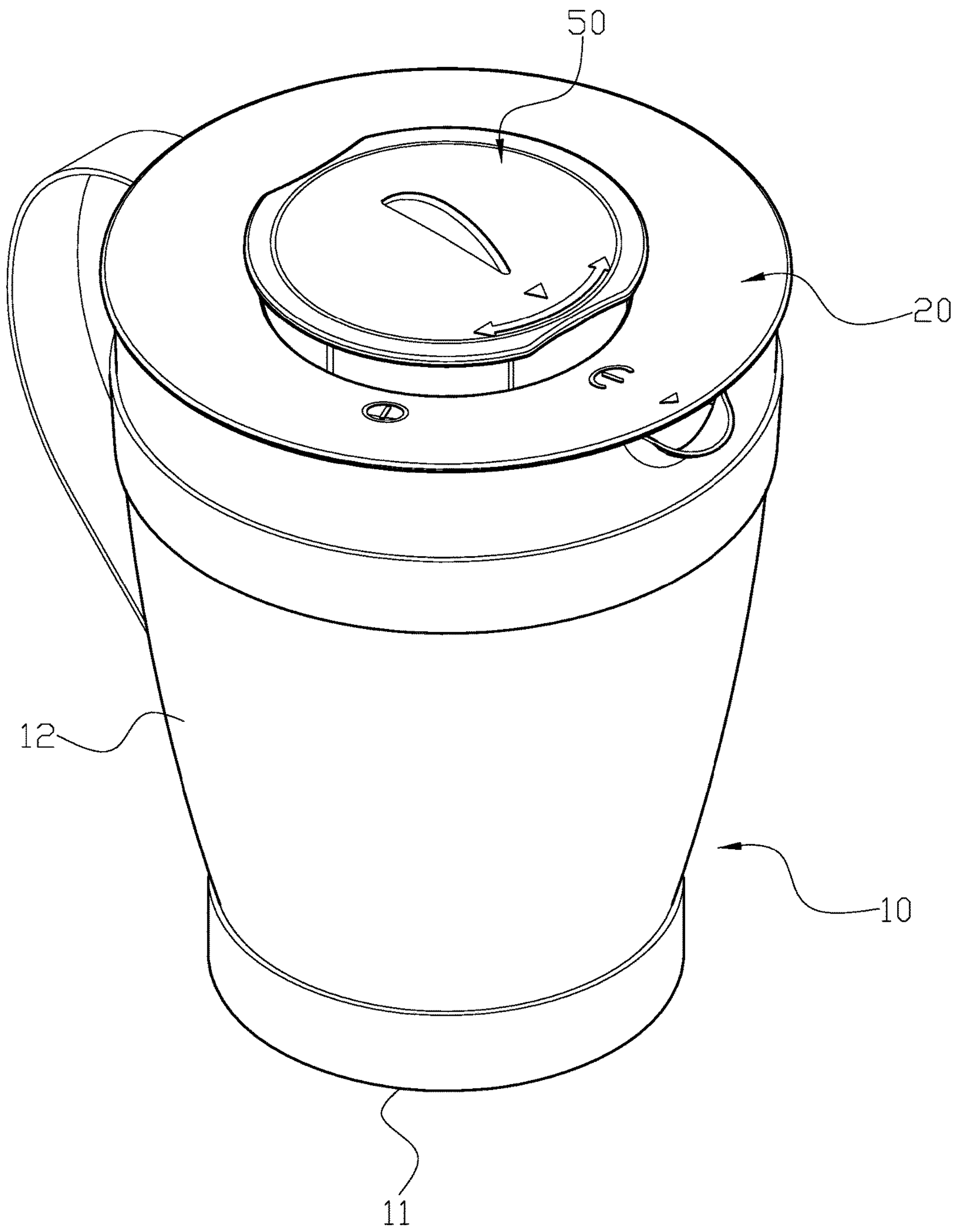
FIG. 1 is a perspective assembly drawing of a preferred embodiment of the present invention.
Figures 2, 3:
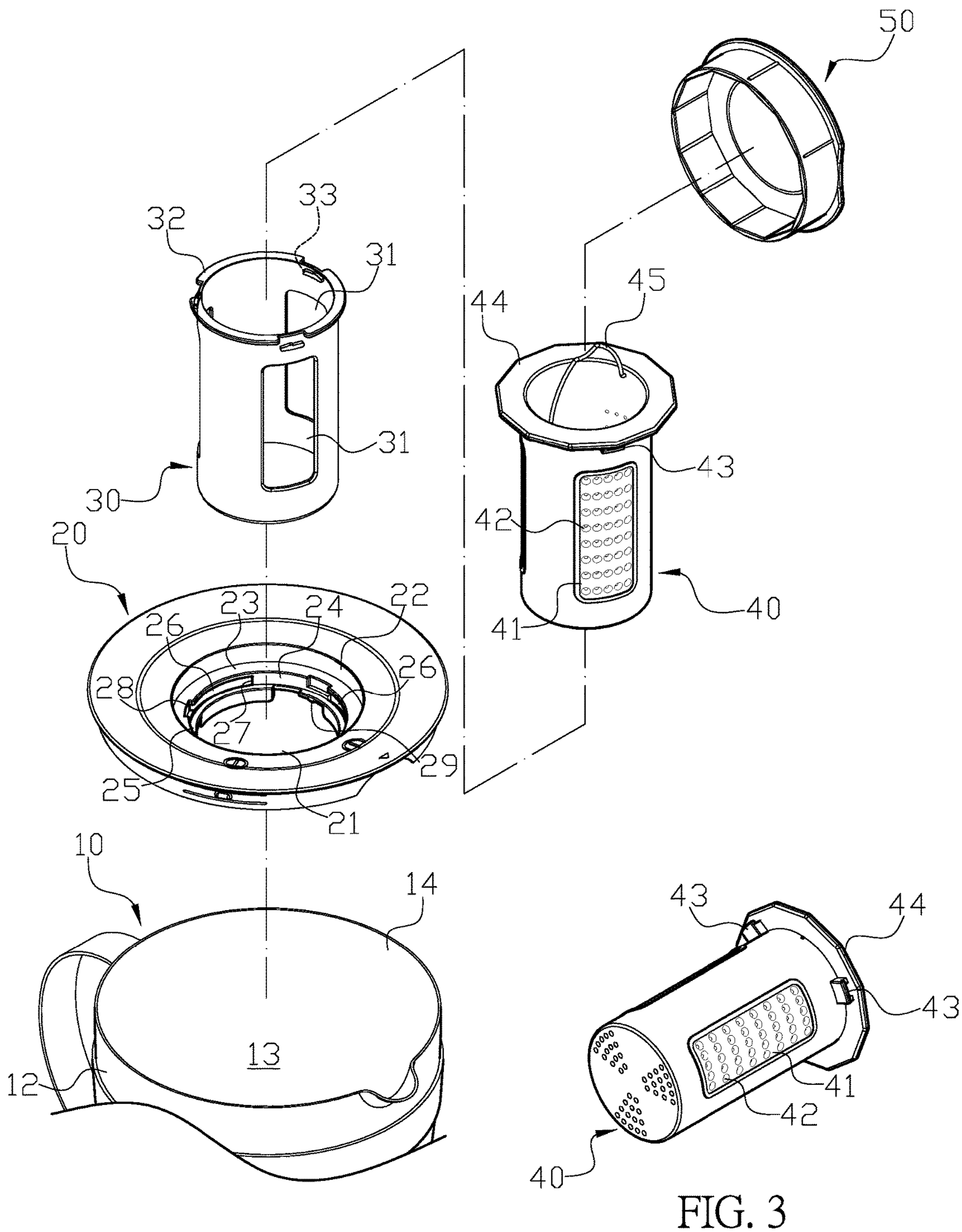
FIG. 2 is a perspective exploded drawing according to the embodiment of the present invention.
FIG. 3 is another view of the inner diffuser body according to the embodiment of the present invention.
Figure 4:
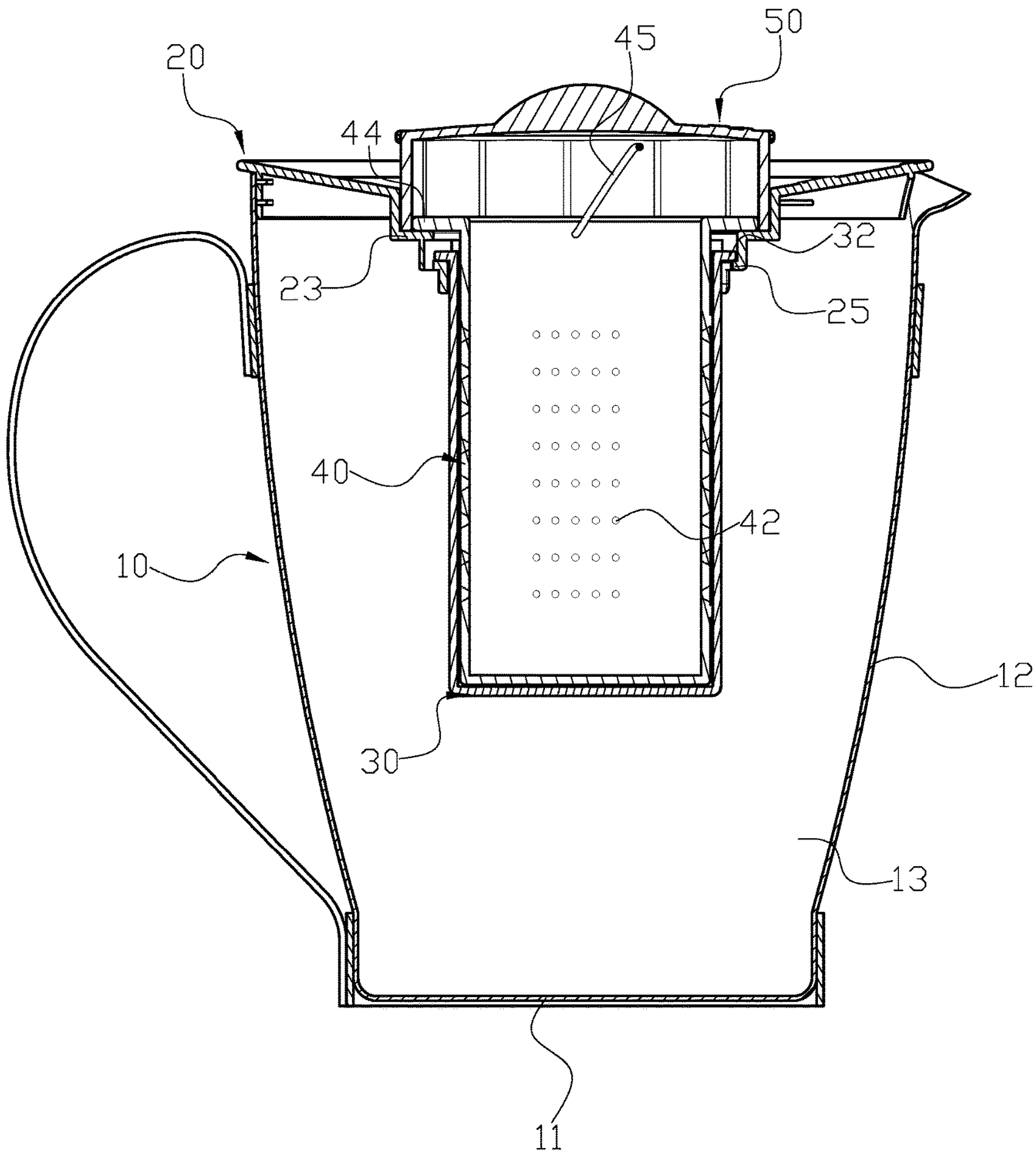
FIG. 4 is a cross-sectional drawing according to the embodiment of the present invention.

Please refer to FIG. 1 to FIG. 4. A diffuser for beverages comprises: a container 10, a cover 20, an outer diffuser body 30, an inner diffuser body 40 and a diffuser cover 50. The container 10 has a bottom portion 11 and a circular sidewall 12 to form a containment space 13 with a main opening 14. The cover 20 has a stepped assembly opening 21, and the assembly opening 21 is provided with a first lip 22, a first stopping rim 23, a second lip 24 and a second stopping rim 25. The second lip 24 has a plurality of rotation slots 26 respectively with a closed end 27 and an open end 28 passing through the first stopping rim 23, and the cover 20 is removably attached onto the container 10 and covers the main opening 14. The outer diffuser body 30 has a cup-shaped body with at least one side opening 31, the outer diffuser body 30 is disposed in the container 10, and the second stopping rim 25 of the cover 20 is used for engaging with the outer diffuser body 30. The inner diffuser body 40 has a cup-shaped body corresponding to the outer diffuser body 30. The inner diffuser body 40 has a filtering portion 41 with a plurality of filtering apertures 42 on its sidewall and a plurality of positioning protrusions 43 are evenly disposed on its outer surface. When the inner diffuser body 40 is placed in the outer diffuser body 30 through the assembly opening 21, the positioning protrusion 43 is aligned with the open end 28 of the rotation slot 26, and by rotating the inner diffuser body 40, the positioning protrusion 43 moves between the open end 28 and the closed end 27 of the rotation slot 26 to control the filtering portion 41 of the inner diffuser body 30 to align with the side opening 31 of the outer diffuser body 30 or offset away from the side opening 31 to connect or separate the container 10 and the inner diffuser body 40. The diffuser cover 50 is removably attached onto the cover 20 and configured for covering the assembly opening 21 of the cover 20. The container 10 might be a tea pot or transparent.

Furthermore, the outer diffuser body 30 is further provided with a third lip 32 having a plurality of securing wedges 33, and the second stopping rim 25 of the cover 20 is further provided with a plurality of securing holes corresponding to the securing wedge 33 and an engaging protrusion 29 below the second stopping rim 25. When the securing wedges 33 pass through the securing hole, the third lip 32 overlays on the second stopping rim 25 of the cover 20 such that the outer diffuser body 30 engages with the cover 20, and wherein by rotating the outer diffuser body 30, the securing wedges 33 and engaging protrusions 29 engage with each other.

In addition, the inner diffuser body 40 is further provided with a fourth lip 44, which is configured for making contact with the first stopping rim 23 of the cover 20. The fourth lip 44 of the inner diffuser body 40 and a periphery edge of the diffuser cover 50 correspondingly have multiple angular shapes.

Moreover, the diffuser cover 50 is made of an elastic material, and the inner diffuser body 40 is further provided with a handle 45.

Figure 5:
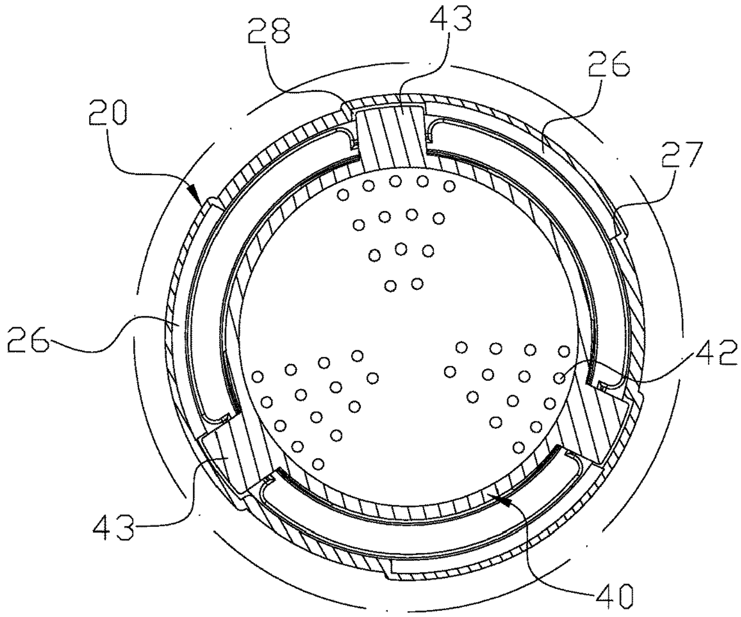
FIG. 5 is a schematic drawing showing the positioning protrusion moving close to the open end according to the embodiment of the present invention.
Figure 6:
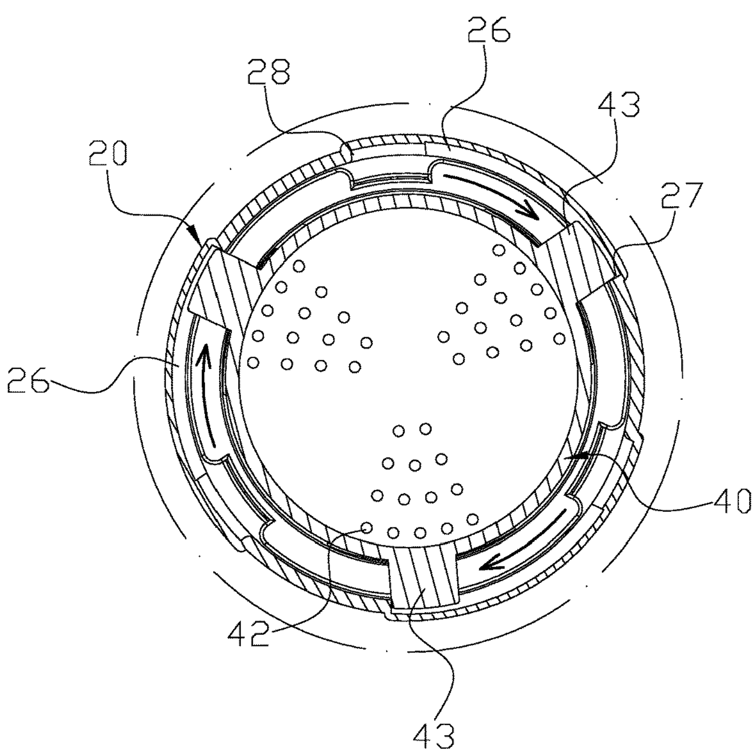
FIG. 6 is another schematic drawing showing according to the embodiment of the present invention.
Figure 7:
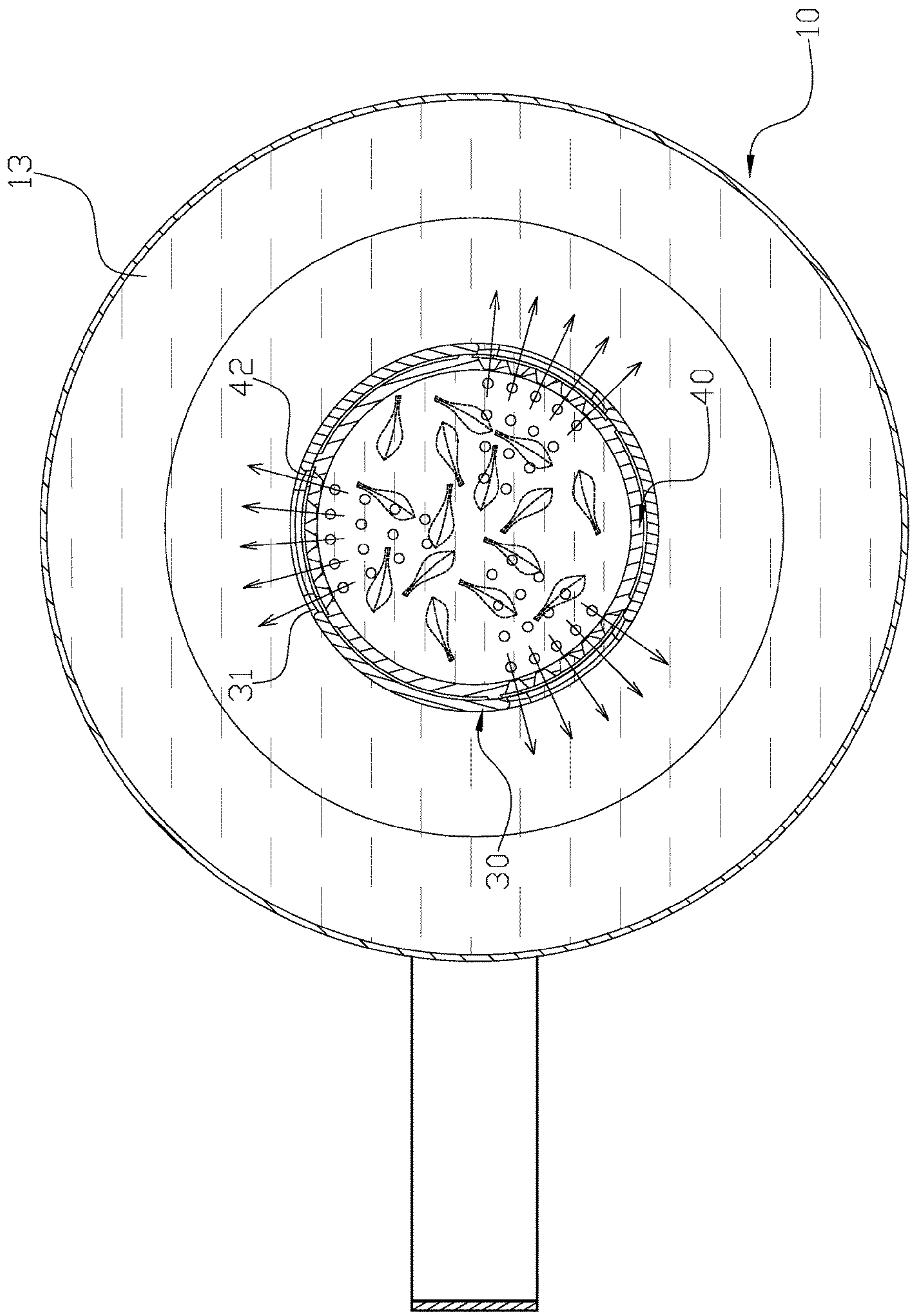
FIG. 7 is a schematic drawing showing the positioning protrusion moving close to the closed end according to the embodiment of the present invention.
Figure 8:
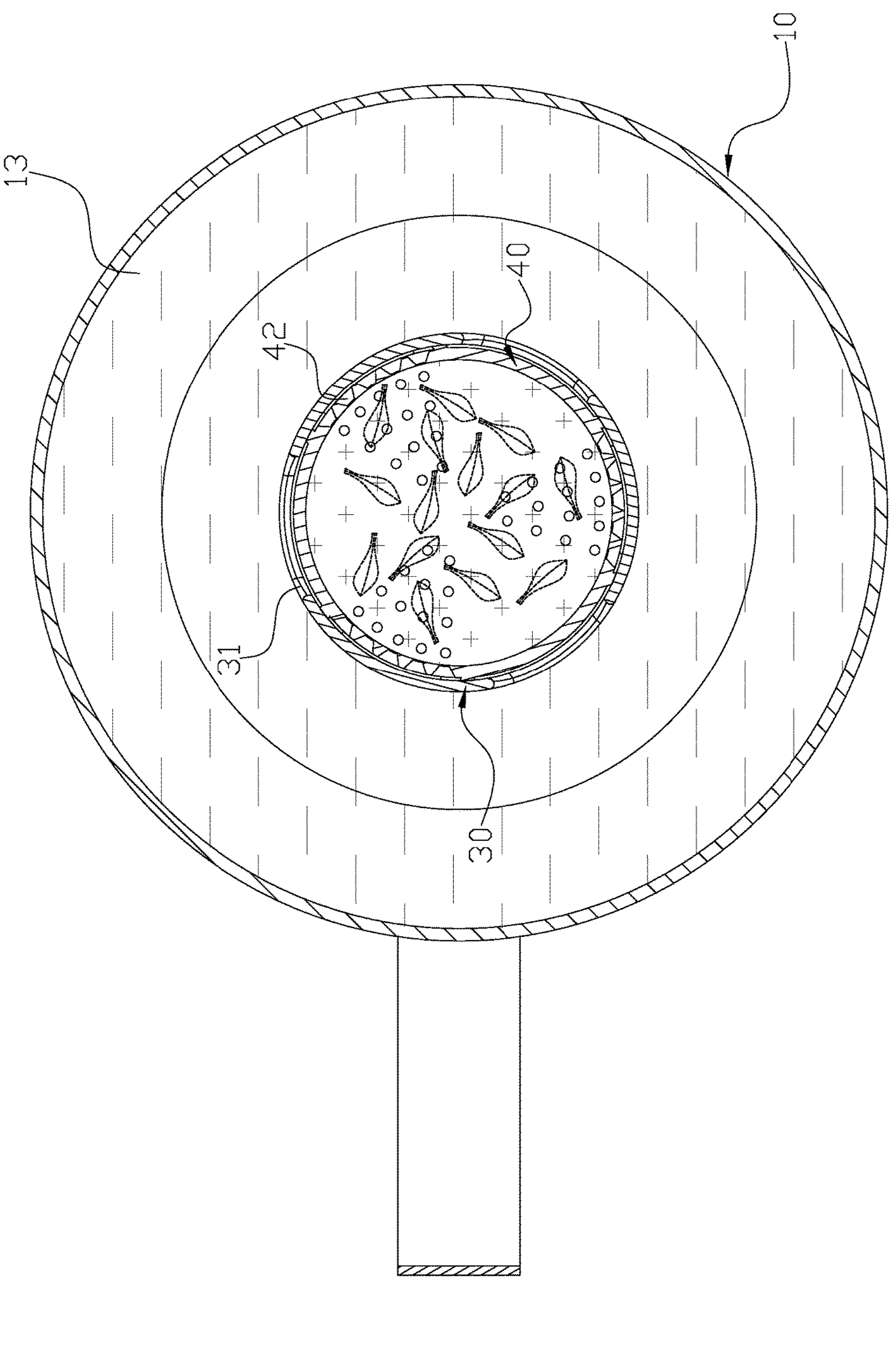
FIG. 8 shows the diffusion process of the beverage according to the embodiment of the present invention.

For actual operation, first, the diffuser cover 50 is removed to allow tea leaves to be placed in the inner diffuser body 40, and when water is pulled into the containment space 13 of the container 10 through the assembly opening 21 of the cover 20. When the side opening 31 and the filtering apertures 42 are connected, tea leaves in the inner diffuser body 40 easily soak in and diffuse the water through the filtering apertures 42 and the side opening 31 in the containment space 13 of the container 10, as shown in FIG. 5 and FIG. 6. After the leaves soaked for a while, by rotating the inner diffuser body 40, the filtering portion 41 and the side opening 31 of the outer diffuser body 30 are offset away from each other, as shown in FIG. 7 and FIG. 8, to prevent the brewed water in the inner diffuser body 40 from entering into the containment space 13.

With the above-mentioned structure, following benefits can be obtained: After the leaves soaked for a while, by rotating the inner diffuser body 40, the filtering portion 41 and the side opening 31 of the outer diffuser body 30 are offset away from each other, as shown in FIG. 7 and FIG. 8, to prevent the brewed water in the inner diffuser body 40 from entering into the containment space 13. Therefore, the over-brewed liquid will not mix with the earlier fresh-brewed liquid, and the inner diffuser body 40 can stay in the container 10 ne need to be taken out. Moreover, with the combination between the rotation slot 26 and the positioning protrusion 43, the positioning protrusion 43 is positioned between the closed end 27 and the open end 28, by rotating the inner diffuser body 40 to control the filtering portion 41 of the inner diffuser body 30 to align with the side opening 31 of the outer diffuser body 30 or offset away from the side opening 31 to connect or separate the container 10 and the inner diffuser body 40.

Although the present invention has been explained in relation to its preferred embodiment, it is to be understood that many other possible modifications and variations can be made without departing from the spirit and scope of invention as hereinafter claimed.

What is claimed is:

1. A diffuser for beverages comprising: a container, a cover, an outer diffuser body, an inner diffuser body, and a diffuser cover, wherein:

the container has a bottom portion and a sidewall to form a containment space with a main opening;

the cover has a stepped assembly opening, the assembly opening provided with a first lip, a first stopping rim, a second lip, and a second stopping rim, the second lip having a plurality of rotation slots, each rotation slot having a closed end and an open end, the open end passing through the first stopping rim, the cover sized to removably engage the container to overlap the main opening;

the outer diffuser body has a cup-shaped body with at least one side opening, the outer diffuser body sized to pass through the assembly opening to be disposed in the container, the cup-shaped body further comprising a third rim sized to engage the second stopping rim of the cover so that the cover engages with the outer diffuser body;

the inner diffuser body has a cup-shaped body corresponding to the outer diffuser body, the inner diffuser body having a filtering portion with a plurality of filtering apertures on a sidewall of the inner diffuser body and a plurality of positioning protrusions disposed on an outer surface of the inner diffuser body, the inner diffuser body configured to be placed in the outer diffuser body through the assembly opening, each positioning protrusion aligning with the open end of a corresponding rotation slot, and by rotating the inner diffuser body, each positioning protrusion moves between the open end and the closed end of the corresponding rotation slot to cause the filtering portion of the inner diffuser body to align with the side opening of the outer diffuser body or to be offset away from the side opening to fluidly connect or separate the container and the inner diffuser body; and the diffuser cover is sized to removably engage the cover for covering the assembly opening of the cover.

2. The diffuser for beverages as claimed in claim 1, wherein the container is a tea pot.

3. The diffuser for beverages as claimed in claim 1, wherein the container is transparent.

4. The diffuser for beverages as claimed in claim 1, wherein the third lip of the outer diffuser body has a plurality of securing wedges; and the second stopping rim of the cover is further provided with a plurality of securing holes corresponding to the securing wedges and corresponding engaging protrusions below the second stopping rim, and when the securing wedges pass through the corresponding securing holes, the third lip overlays on the second stopping rim of the cover such that the outer diffuser body engages with the cover, and wherein by rotating the outer diffuser body, the securing wedges and engaging protrusions engage with each other.

5. The diffuser for beverages as claimed in claim 1, wherein the inner diffuser body is further provided with a fourth lip, which is configured for making contact with the first stopping rim of the cover.

6. The diffuser for beverages as claimed in claim 5, wherein the fourth lip of the inner diffuser body and a periphery edge of the diffuser cover have corresponding polygonal shapes.

7. The diffuser for beverages as claimed in claim 1, wherein the diffuser cover is made of an elastic material.

8. The diffuser for beverages as claimed in claim 1, wherein the inner diffuser body is further provided with a handle.

* * * * *